(12) United States Patent
Beaumont et al.

(10) Patent No.: US 11,100,110 B2
(45) Date of Patent: Aug. 24, 2021

(54) SPLIT-ASSOCIATIVE DATA STORE AND ASSOCIATED CONTROL LOGIC

(71) Applicant: Substrate Inc., Amsterdam (NL)

(72) Inventors: Christian Beaumont, Amsterdam (NL); Behnaz Beaumont, Amsterdam (NL); Jouke van der Maas, Koog aan de Zaan (NL); Jan Drake, Seattle, WA (US)

(73) Assignee: Substrate Inc., Amsterdam (NL)

( * ) Notice: Subject to any disclaimer, the term of this patent is extended or adjusted under 35 U.S.C. 154(b) by 76 days.

(21) Appl. No.: 16/361,613

(22) Filed: Mar. 22, 2019

(65) Prior Publication Data

US 2019/0294611 A1 Sep. 26, 2019

Related U.S. Application Data

(60) Provisional application No. 62/648,024, filed on Mar. 26, 2018.

(51) Int. Cl.
*G06F 16/2455* (2019.01)
*G06F 16/903* (2019.01)

(52) U.S. Cl.
CPC .. *G06F 16/24568* (2019.01); *G06F 16/90339* (2019.01); *G06F 16/90344* (2019.01)

(58) Field of Classification Search
CPC ............. G06F 40/205; G06F 16/24568; G06F 16/258; G06F 16/282
USPC ......................................................... 707/713
See application file for complete search history.

(56) References Cited

U.S. PATENT DOCUMENTS

2012/0240062 A1\* 9/2012 Passmore ................ H04L 51/32
715/758
2017/0124166 A1\* 5/2017 Thomas ............ G06F 16/24568

OTHER PUBLICATIONS

"A Self-Describing Data Transfer Model for ITS Applications", Daniel J. Dailey; IEE Transaction on Interlligent Transportation Systems, vol. 3, No. 4, Dec. 2002.\*

\* cited by examiner

*Primary Examiner* — Hung T Vy
(74) *Attorney, Agent, or Firm* — BakerHostetler

(57) ABSTRACT

A de-serialized data store and transaction system includes a content addressable memory mapped to an n-tuple-based multimodal data structure, the n-tuple-based multimodal data structure supporting heterogeneous nested data types including a streamable abstract syntax tree and a self-describing operational interface comprising commands transmitted via a plurality of nested s-expressions.

4 Claims, 14 Drawing Sheets

SPLIT-ASSOCIATIVE DATA STORE AND ASSOCIATED CONTROL LOGIC

CROSS-REFERENCE

This application claims benefit under 35 U.S.C. § 119(e) of Provisional U.S. patent application No. 62/648,024, filed Mar. 26, 2018, the contents of which are incorporated herein by reference in their entirety.

BACKGROUND

Current ways of implementing database information retrieval can be extremely resource intensive. Conventional database systems are used extensively to store and retrieve data in a structured fashion. Such systems are typically responsive to structured query language (SQL) commands specifying criteria for characteristics of data to retrieve. Conventional database systems often have limitations when it comes to managing the type of freeform data commonly generated by social media platforms, free-form chat, and other applications that run in a distributed, real-time, and interactive fashion using many (often thousands) of diverse end user devices. Current methods of data storage and retrieval are inefficient and limit the usability of the systems. Current methods can cause conflicts when multiple parties need to read and write data in a short time frame. For example, currently read/write locks are monopolized for long periods of time during database transactions, preventing the data from being accessed by other parties. Further, the current paradigm's structure around holding locks for long periods can create large efficiency bottlenecks in current systems. In addition to these inefficiencies, the locks themselves cycle slowly. Industry standard reader/writer (RW) locks such as the std::shared_lock implementation are built into leading implementations such as GCC, CLang or Posix Threads. These implementations of a Multiple-Reader/Single-Writer (MRSW lock) typically use a mutex/critical section to protect the use counters. A readers/writer (RsW) or shared-exclusive lock (also known as a multiple readers/single-writer lock or multi-reader lock or push lock) is a synchronization primitive that allows concurrent access for read-only operations, while write operations require exclusive access. This means that multiple threads can read the data in parallel, but an exclusive lock is needed for writing or modifying data. When a writer is writing the data, all other writers or readers will be blocked until the writer is finished writing. A common use might be to control access to a data structure in memory that cannot be updated atomically and is invalid (and should not be read by another thread) until the update is complete. RsW locks are usually constructed on top of mutexes and condition variables, or on top of semaphores.

Conventional databases may also require substantial data duplication to store and relate different categories and types of data. Multimodal databases are often implemented using disparate technologies likely provided by independent vendors who specialize in subsets of full multi-modality. Further, multimodal databases are often stretched across multiple process spaces, for example, a time series database, document database and graph database may all be separately stored in different physical databases spread across multiple separate process spaces or machines on a network. This leads to increases in overhead as well as an increase in latency and complexity as the systems must manage multiple connections when exchanging information and/or executing queries. Additionally, due to use of heterogeneous storage mechanisms, data is stored in multiple different formats often requires a great deal of data redundancy, network transfers and data serialization, and the serialization process is often nontrivial and can be very resource intensive at scale.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
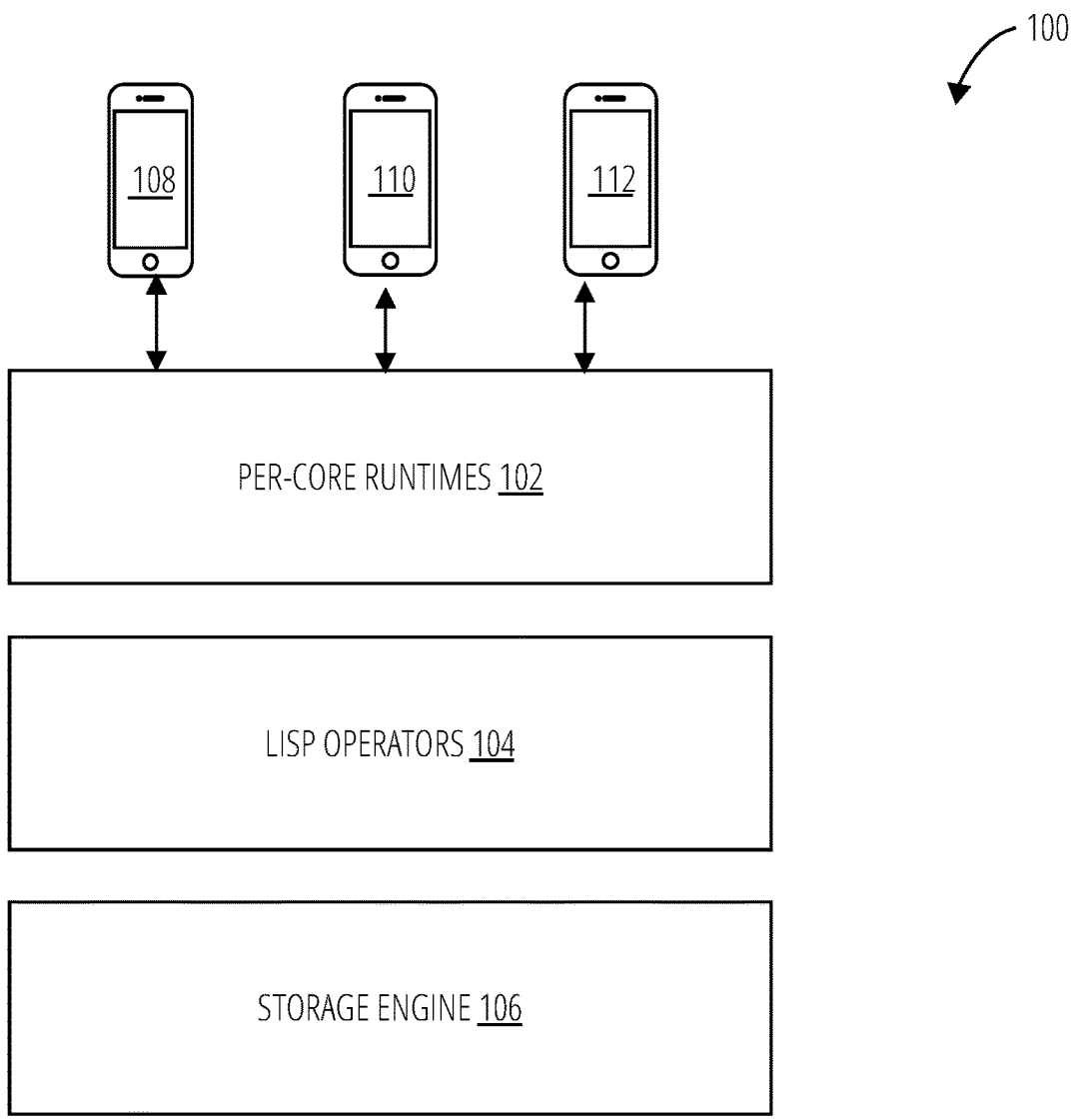
FIG. 1 illustrates a database access stack 100 in accordance with one embodiment.

Referring to FIG. 1 the database access stack 100 comprises per-core runtimes 102, lisp operators 104, a storage engine 106, a computing device 108, a computing device 110, and a computing device 112.

The computing device 108, the computing device 110, and the computing device 112 access the storage engine 106 via the per core runtimes 102, and the lisp operators 104.

Figure 2:
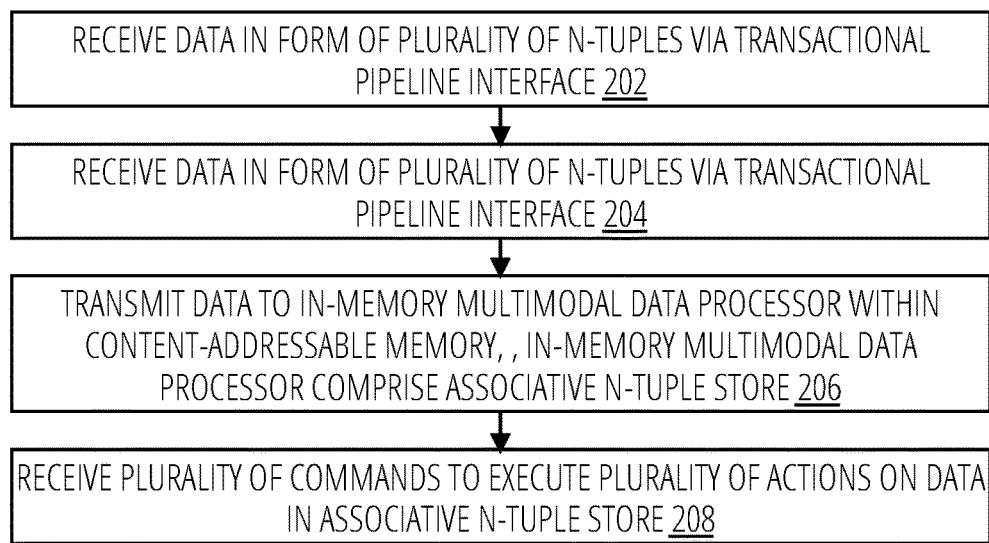
FIG. 2 illustrates a data storage architecture 200 in accordance with one embodiment.

Referring now to FIG. 2, the process for implementing a multimodal split-associative data store and control 200 receives data in the form of a plurality of n-tuples via a transactional pipeline interface (block 202).

The process for implementing a multimodal split-associative data store and control 200 transmits the data to an in-memory multimodal data processor within a content-addressable memory, the in-memory multimodal data processor comprises an associative n-tuple store (block 204).

The process for implementing a multimodal split-associative data store and control 200 and receives a plurality of commands to execute a plurality of actions on the data in the associative n-tuple store (block 206).

A process receives data in the form of a plurality of n-tuples via a transactional pipeline interface. The process then transmits the data to an in-memory multimodal data processor within a content-addressable memory, the in-memory multimodal data processor comprises an associative n-tuple store. The process then and receives a plurality of commands to execute a plurality of actions on the data in the associative n-tuple store.

Figure 3:
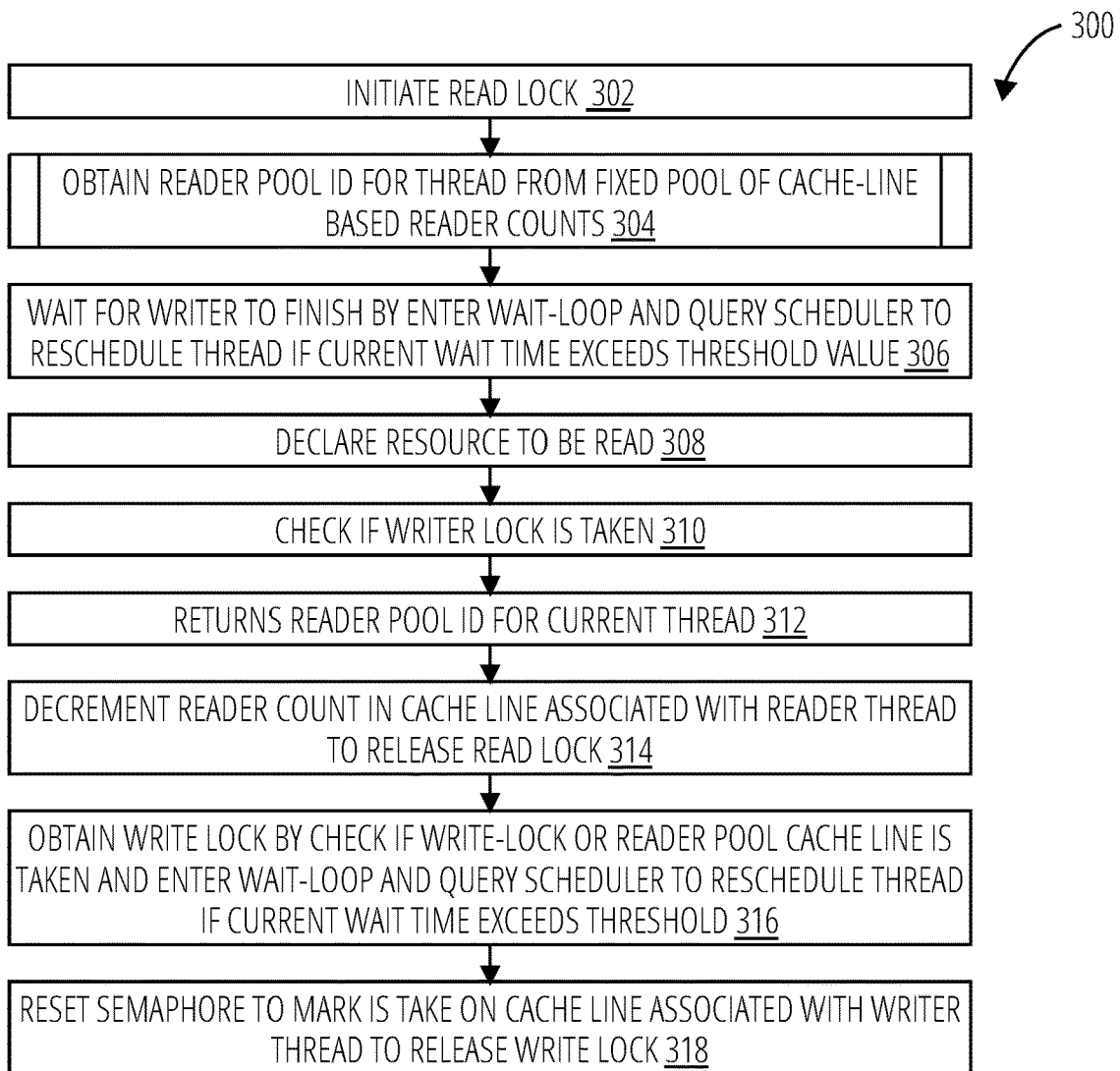
FIG. 3 illustrates an item 300 in accordance with one embodiment.

Referring now to FIG. 3, the process for controlling read/write access to a database 300 obtains a reader pool ID for a thread from a fixed pool of cache-line based reader counts to initiate a read lock (block 302).

The process for controlling read/write access to a database 300 waits for a writer to finish by enters a wait-loop and queries a scheduler to reschedule the thread if current wait time exceeds a threshold value (block 204).

The process for controlling read/write access to a database 300 declares a resource to be read (block 306).

The process for controlling read/write access to a database 300 checks if a writer lock is taken (block 308).

The process for controlling read/write access to a database 300 returns the reader pool ID for the current thread (block 310).

The process for controlling read/write access to a database 300 and decrements the reader count in a cache line associated with the reader thread to release the read lock (block 312).

The process for controlling read/write access to a database 300 obtains a write lock by checks if a write-lock or reader pool cache line is taken and enters a wait-loop and queries a scheduler to reschedule the thread if current wait time exceeds a threshold (block 314).

The process for controlling read/write access to a database 300 and resets the semaphore to mark is take on the cache line associated with the writer thread to release the write lock (block 316).

A process for controlling read/write access initiates a read lock, the process obtains a reader pool ID for a thread from a fixed pool of cache-line based reader counts. The process then waits for a writer to finish by enters a wait-loop and queries a scheduler to reschedule the thread if current wait time exceeds a threshold value. The process then declares a resource to be read. The process then checks if a writer lock is taken. The process then returns the reader pool ID for the current thread. The process then and decrements the reader count in a cache line associated with the reader thread to release the read lock. The process then obtains a write lock by checks if a write-lock or reader pool cache line is taken and enters a wait-loop and queries a scheduler to reschedule the thread if current wait time exceeds a threshold. The process then and resets the semaphore to mark is take on the cache line associated with the writer thread to release the write lock.

Figure 4:
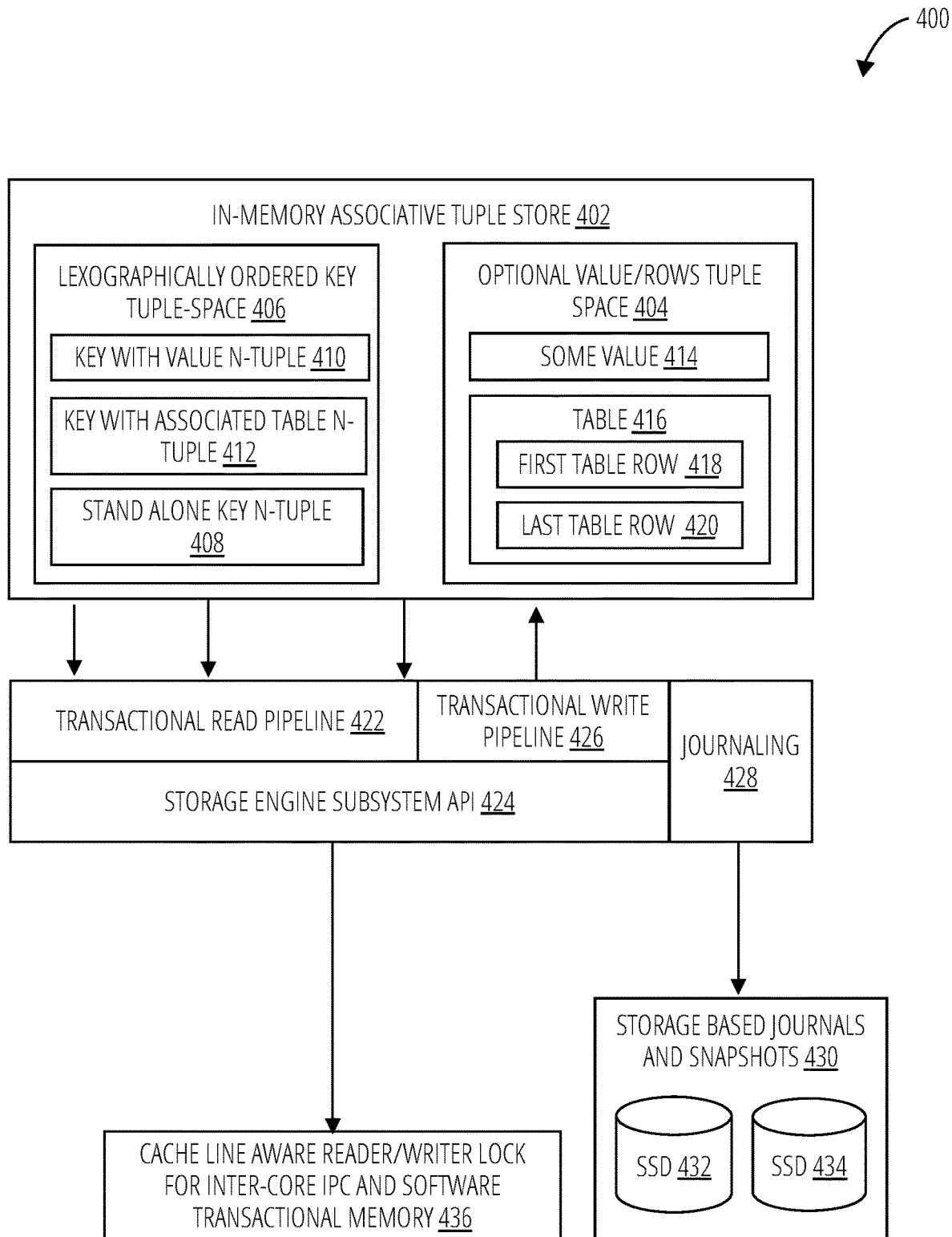
FIG. 4 illustrates a proxy-free data access security 400 in accordance with one embodiment.

Referring now to FIG. 4, The database a data storage architecture 400 comprises an in-memory associative tuple store 402, an optional value/rows key-tuple store 204, a lexicographically ordered key tuple-store 206, a stand-alone key n-tuple 208, a key with value n-tuple 410, a key with associated table n-tuple 412, a value 214, a table 416, a first table row 418, a last table row 420, a transactional read pipeline 422, a storage engine subsystem API 424, a transactional write pipeline 426, journaling 428, storage based journals and snapshots 430, a ssd 432, a ssd 434, and a cache line aware reader/writer lock for inter-core ipc and software transactional memory 436.

To protect internal database structures, and increase the efficiency of reading and writing data, read/write locking mechanism is implemented. The read/write lock ensures that a write lock is only taken when necessary and released as quickly as possible after the write is complete. In order to minimize write lock duration, updates may be prepared before the write lock is taken. The read/write lock relies on CPU cache lines to modify the counters in a minimal-contention manner using only low-level processor-intrinsic instructions to protect the memory being modified or read. Because for each database partition only one writer may be present at any time, a semaphore may be maintained to mark if the write lock is taken. On the other hand, any number of threads may be reading at the same time (when no writes are occurring). Conceptually, for read locks a counter may be maintained which indicates the number of readers that are reading. Threads using the lock will either attempt to read or write to some shared data structure protected by the lock. A thread attempting to access the protected data structure will declare its intention to read or write by using the API of the lock. When any thread wishes to read, the thread calls TakeReadLock( ), reads from the protected data-structure and then calls ReleaseReadLock( ). When any thread wishes to write, the thread calls TakeWriteLock( ), writes to the protected data-structure and then calls ReleaseWriteLock( ). The process for obtaining a read lock is:

1) When a thread is attempting to obtain a read lock, it first waits for the write lock to be released if the lock is currently being held.

2) The counter representing the number of readers for the current thread group is optimistically increased.

3) Because there is a possibility of a race condition, check once more to ensure that the write lock is still clear.

4) If the write lock is now set, then the read lock is rolled back, and the process returns to step (1)

5) If the write lock is clear, then a read lock has been successfully obtained. To release the read lock all that is necessary is to decrement the counter representing the number of readers.

The process for obtaining a write lock is:

1) When a thread wishes to obtain the write lock it first waits to make sure no other writers are present (using a CAS operation).

2) Once the write lock has been obtained, wait for the counters that represents the number of readers to fall to zero.

3) At this point a write lock has been obtained.

The read and write counters may be represented using atomic variables spaced evenly on cache lines. The counter for the number of readers is implemented as a pool of cache-line aligned counters that provide no write contention in the normal case where the number of counters representing threads running is equal or more than the number of cores on the machine.

In mathematics a tuple is a finite ordered list (sequence) of elements. An n-tuple is a sequence (or ordered list) of n elements, where n is a non-negative integer. There is only one 0-tuple, an empty sequence.

The following exemplary code fragment creates a key in the Substrate tuple-store.(db.createKey "MyFirstTuple"). With tuples each element may be of different types, and there may be as many elements as needed, allowing much more complex tuples to be specified.

Tuple elements, (atoms), and may be, for example, one of the following types: UTF8 encoded string, Boolean, integer, IEEE 754 32 or 64-bit float, UTF8 encoded string, a binary string literal, identifier symbol. Further, compound atoms comprised of data structures may also be used, for example, lists, vectors, maps, dictionaries.

Examples of lists, vectors and maps being:

```
Lists:
(1 2 3 4 5 6)
(someSymbol "hello" true)
Vectors:
["i" "am" "a" "vector" true]
  [0.1 23.5 16.0]
Maps:
{
"firstName": "Harry"
"lastName": "Potter"
}
or:
{
"name":"Seattle"
"position": [
47.6129432
-122.4821475
]
}
```

By way of example, creating tuples of animals and their maximum running speed in kilometers per hour may be accomplished by: (db.createKey ["Mammal" "Greyhound" 63.5])(db.createKey ["Bird" "Penguin" 48.0])(db.createKey ["Mammal" "Rabbit" 48.0])(db.createKey ["Bird" "Roadrunner" 32.0]). This illustrates a mix of type string and double. Tuple elements may be any of the following types but not limited to: string, float, double, integer (signed/unsigned) tuple, symbol expression (S-Expression), Boolean, binary blobs, symbol. Because a tuple is also a data type, it is possible to create arbitrarily nested tuples, for example: (db.createKey ["Mammal" "House Mouse" 13.0 ["Likes" ["Apples" "Cheese"]]]). The length (or arity) of tuples does not need to be uniform. Not all the tuples from the earlier examples have the same length. By way of example, time series data from several temperature sensors, measurements taken at regular intervals, may store the following properties for each measurement: the sensor ID, the timestamp, and the measured temperature. For querying purposes, these are stored in tuples of the following form: [<timestamp><sensorId><value>], for example [1478612156 2 15.2][1478612160 0 22.4][1478612160 3 25.1][1478612170 1 21.7][1478622176 0 21.8] [1478622176 2 15.0][1478622182 1 22.3][1478622183 3 23.5].

Another example is representation of a 3D cube using tuples:
Vertices:
[0 -0.5 0.5 -0.5][1 -0.5 0.5 0.5][2 0.5 0.5 0.5][3 0.5 0.5 -0.5][4 -0.5 -0.5 -0.5][5 -0.5 -0.5 0.5][6 0.5 -0.5 0.5][7 0.5 -0.5 -0.5]
Faces:
[;|-X face|; [5 1 0] [5 0 4];|+X face|; [7 3 2] [7 2 6];|-Y face|; [7 6 5] [7 5 4];|+Y face|; [2 3 0] [2 0 1];|-Z face|; [4 0 3] [4 3 7];|+Z face|; [6 2 1] [6 1 5]].

Another example is representation of geospatial data: [-74.0059413;| longitude 40.7127837|; latitude "New York";| city|; 8405837;| population|;][-118.2436849 34.0522342 "Los Angeles" 3884307][-87.6297982 41.8781136 "Chicago" 2718782][-95.3698028 29.7604267 "Houston" 2195914][-75.1652215 39.9525839 "Philadelphia" 1553165].

Figure 5:
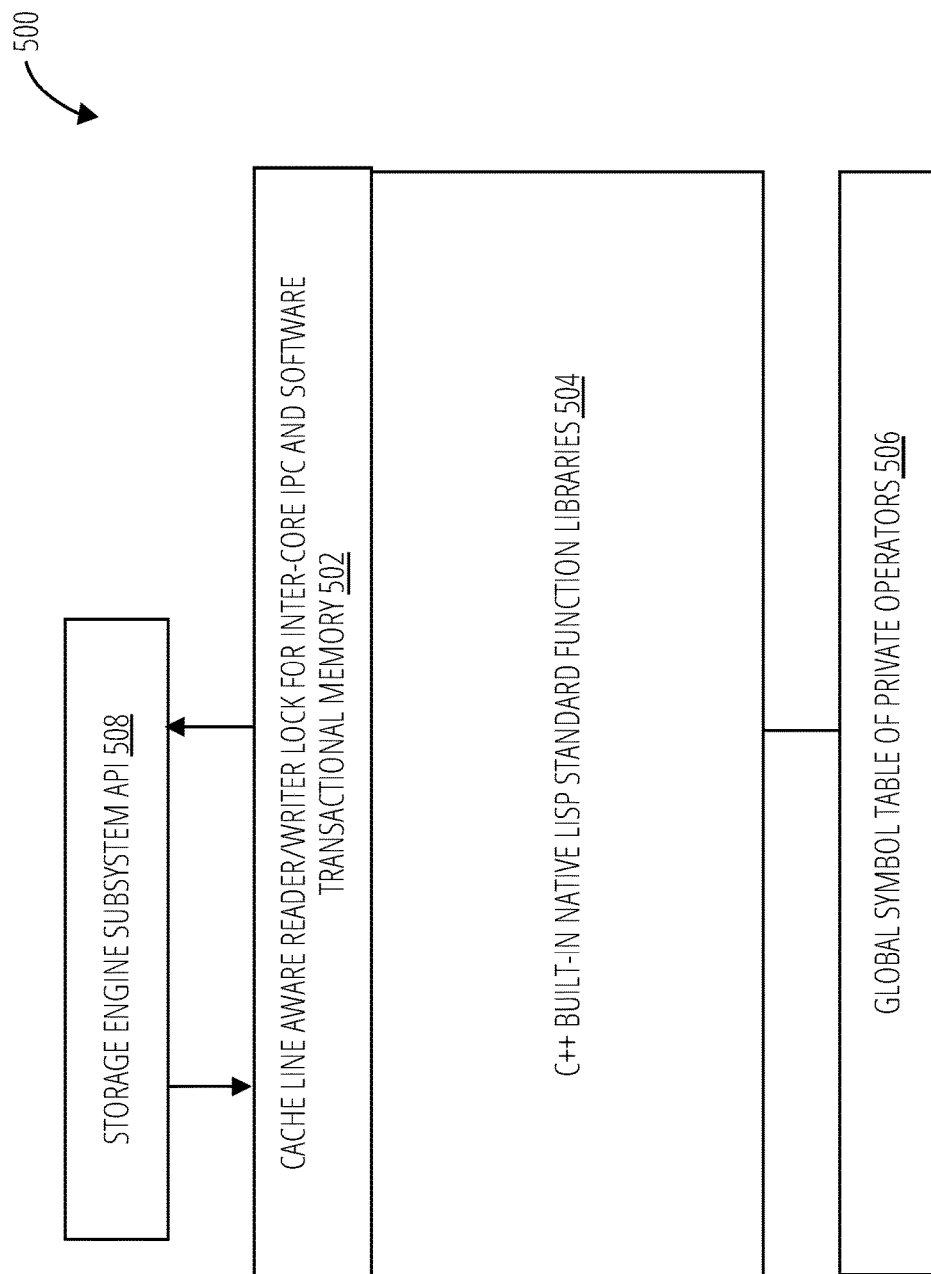
FIG. 5 illustrates a content addressable memory 500 in accordance with one embodiment.

Referring now to FIG. 5, a proxy-free data access security system 500 comprises a cache line aware reader/writer lock for inter-core ipc and software transactional memory 502, c++ built-in native lisp standard function libraries 504, a global symbol table of private operators 506, and a storage engine subsystem API 508. The storage engine subsystem API 508 accesses the global symbol table of private operators 506 via the cache line aware reader/writer lock for inter-core ipc and software transactional memory 502 and the c++ built-in native lisp standard function libraries 504.

Figure 6:
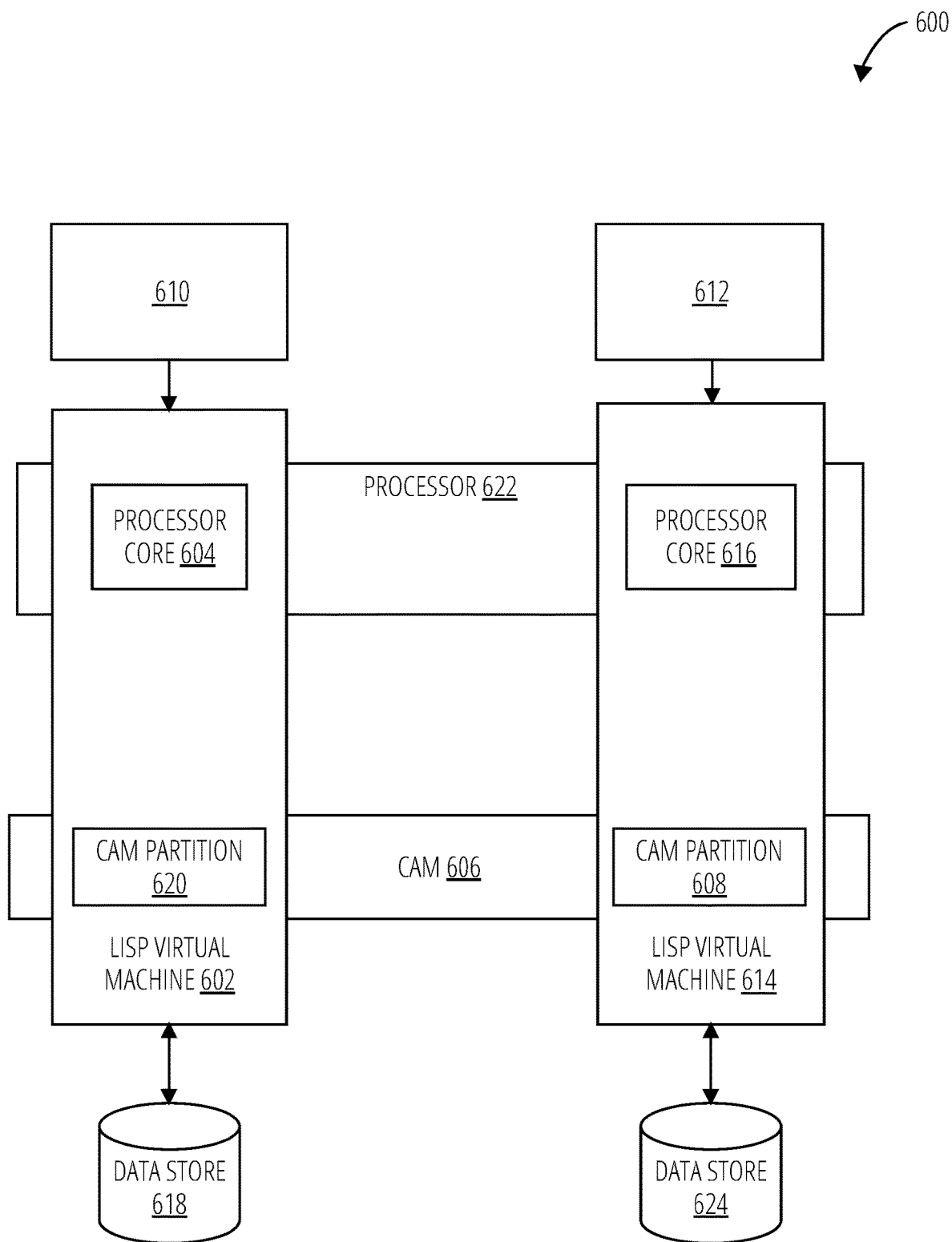
FIG. 6 illustrates a database read/write access control mechanism 600 in accordance with one embodiment.

Referring now to FIG. 6, a proxy-free data access security system 600 comprises a Lisp virtual machine 602, a processor core 604, a cam 606, a cam partition 608, a computing device 610, a computing device 612, a Lisp virtual machine 614, a processor core 616, a data store 618, a cam partition 620, a processor 622, and a data store 624. The computing device 610 accesses the data store 618 via the Lisp virtual machine 602. The computing device 612 accesses the data store 624 via the Lisp virtual machine 614. The processor core 616 and the processor core 604 may be within the processor 622. The cam partition 620 and the cam partition 608 may be partitioned from the cam 606.

Figure 7:
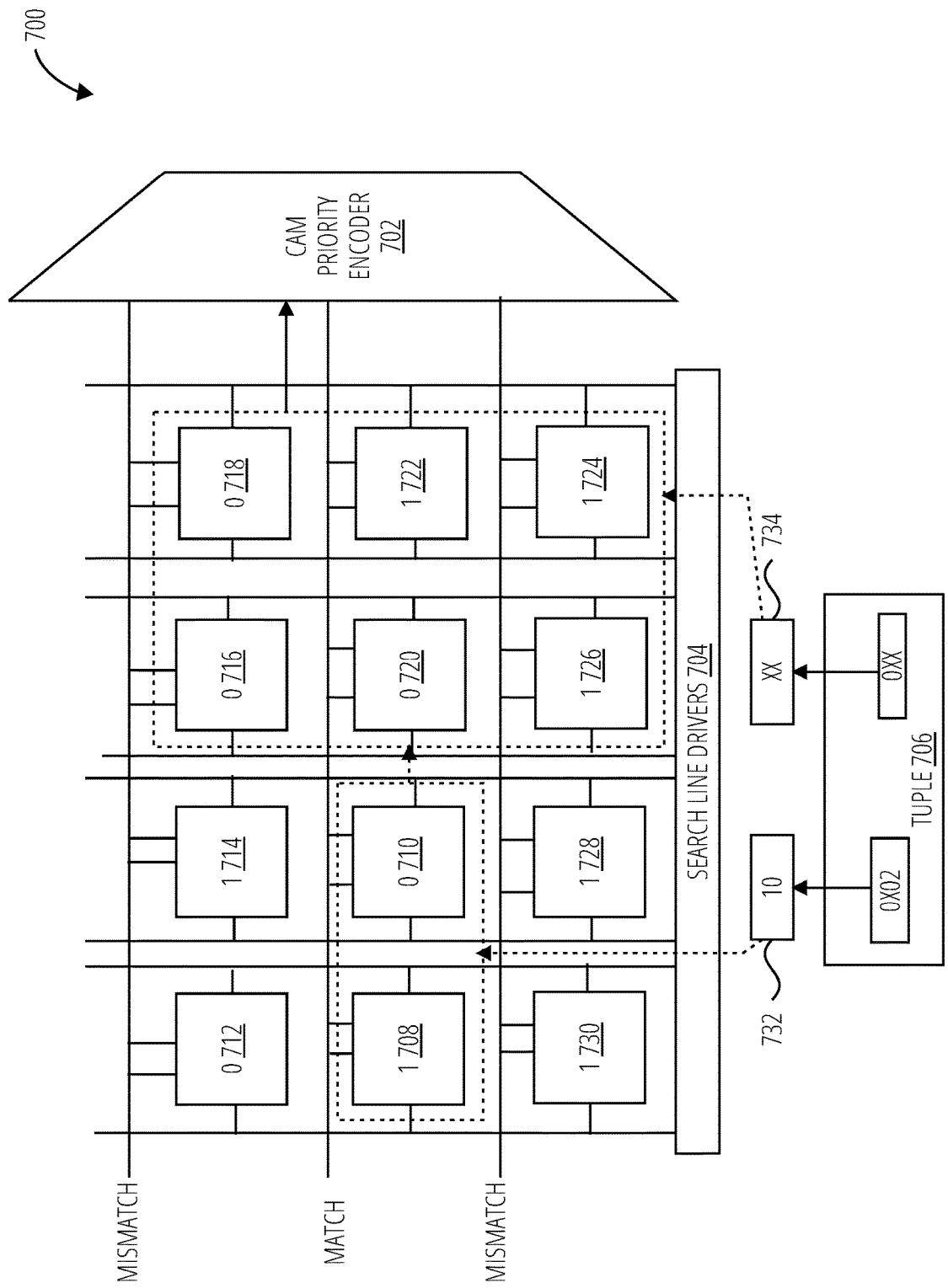
FIG. 7 illustrates a split-associative data store 700 in accordance with one embodiment.

Referring now to FIG. 7, a content addressable memory 700 comprises a CAM priority encoder 702, search line drivers 704, a tuple 706, and memory cells 508-530. The tuple 706 further comprises an element 732 and an element 734. The search line drivers 704 receive a tuple 706, the element 732 matches with the memory cell 508 and the memory cell 510 and the "don't care" values specified in element 734 match with elements memory cell 516, memory cell 518, memory cell 520, mem cell 722, memory cell 526, and mem cell 724. CAM priority encoder 702 returns the row that includes the memory cell 508, the memory cell 510 the memory cell 520 and the mem cell 722.

Figure 8:
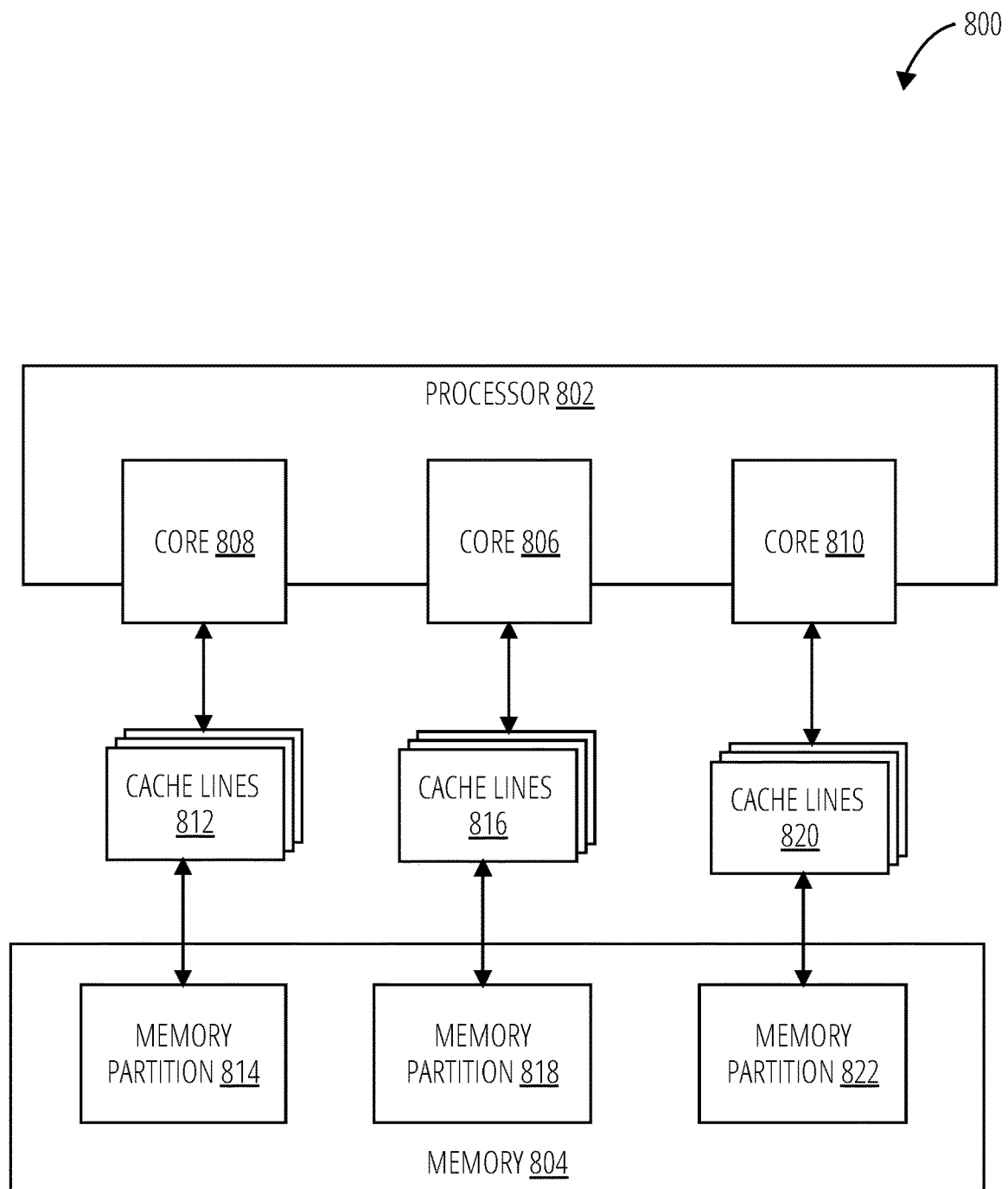
FIG. 8 illustrates a standard serialization/deserialization 800 in accordance with one embodiment.

Referring now to FIG. 8 a database read/write access control mechanism 800 comprises the processor 802, the memory 804, the cache lines 812, the cache lines 816, and the cache lines 820. The processor 802 further comprises the core 808, the core 806 and the core 810. The memory 804 further comprises the memory partition 814, memory partition 818, and the memory partition 822. The cache lines 812 is pinned to the core 808 and the memory partition 814. The cache lines 816 are pinned to the core 806 and the memory partition 818 the cache lines 820 are pinned to the memory partition 822 and the core 810.

Figure 9:
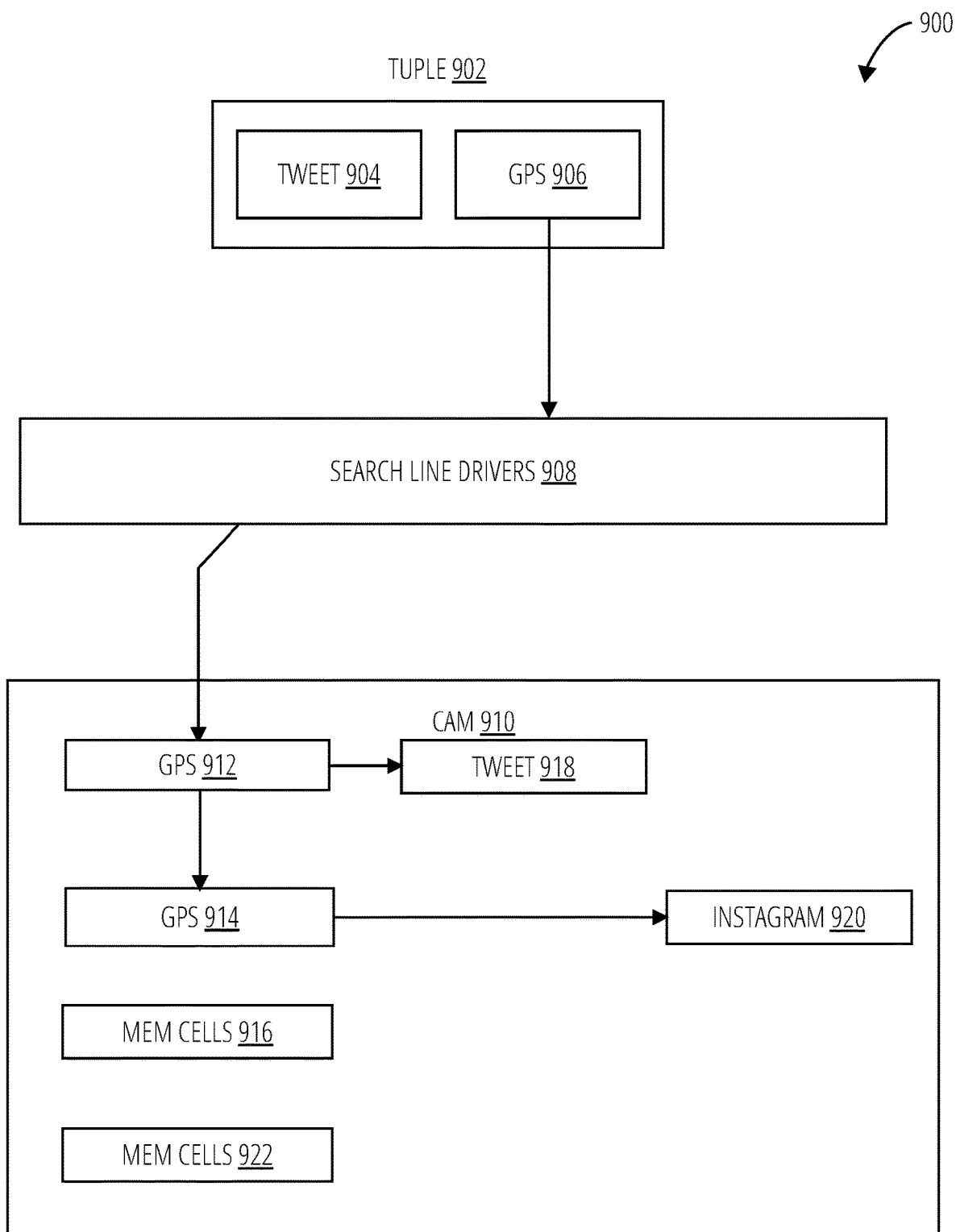
FIG. 9 illustrates a de-serialized data store transaction system 900 in accordance with one embodiment.

Referring now to FIG. 9, a split-associative data store 900 comprises a tuple 902, a tweet 904, a GPS 906, search line drivers 908, a CAM 910, a GPS 912, a GPS 914, a memory cells 716, a tweet 918, an Instagram 920, and a memory cells 722. The CAM 910 receives a tuple 902 via the search line drivers 908. The cam 606 receives the tuple 902, the tuple 902, and the GPS 906. The cam 606 may return the tweet 918 associated with the GPS 912 and the Instagram 920 associated with the GPS 914.

Figure 10:
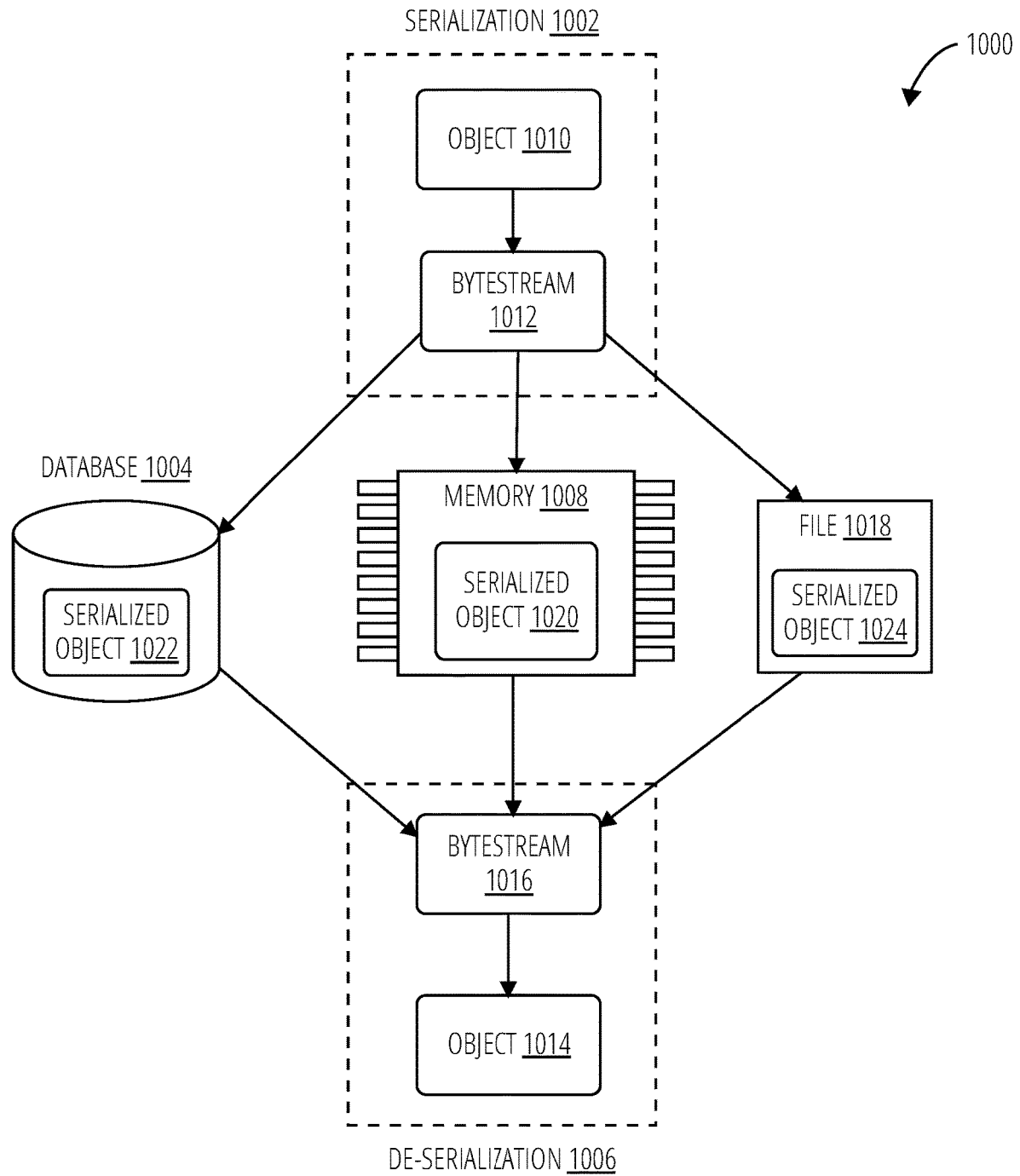
FIG. 10 illustrates a unified data store taxonomy model 1000 in accordance with one embodiment.

Referring now to FIG. 10, a serialization 1002, a database 1004, a deserialization 1006, a memory 1008, an object 1010, a bytestream 1012, an object 1014, a bytestream 1016, and a file 1018. During serialization 1002 the object 1010 is serialized into bytestream 1012 and saved to the database 1004 as serialized object 1022, saved to the memory 1008 as serialized object 1020 and the file 1018 as serialized object 1024. The serialized object 1024, the serialized object 1020 and the serialized object 1022 are deserialized in deserialization 1006 to bytestream 1016 and object 1014.

Generally, information stored in databases is stored and retrieved in different formats requiring the data to be "serialized." In the context of data storage, serialization is the process of translating data structures or object state into a format that can be stored (for example, in a file or memory buffer) or transmitted (for example, across a network connection link) and reconstructed later (possibly in a different computer environment). data of different types often needs to be stored in separate databases, for example a time series database, a graph database and a document database and the formats must be serialized and deserialized to and to relate them together and perform various operations. Often, additional databases are created to conveniently relate data of disparate types.

Figure 11:
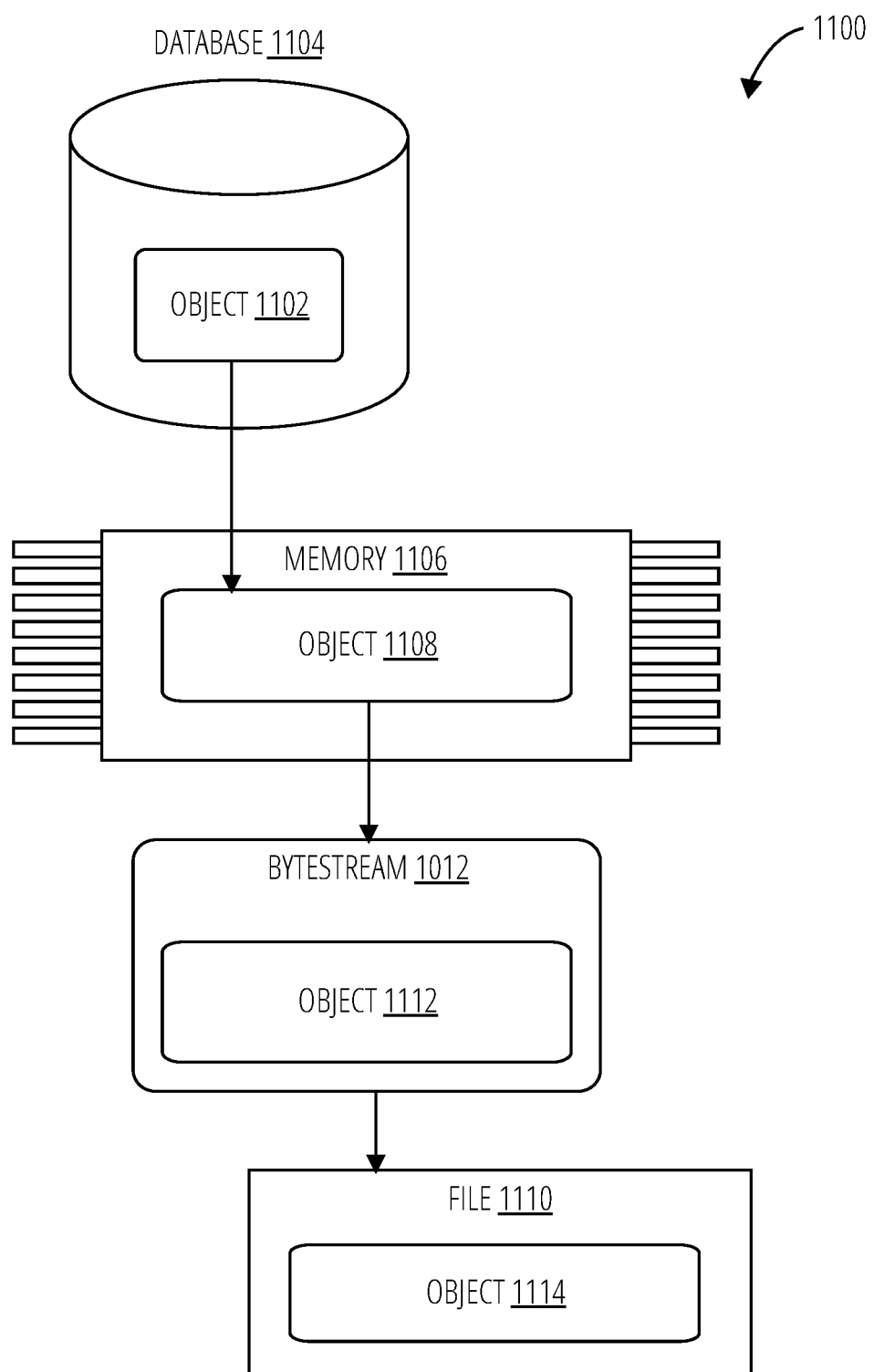
FIG. 11 illustrates a unified data store and transaction system 1100 in accordance with one embodiment.

Referring now to FIG. 11, a bytestream 1012, an object 1102, a database 1104, a memory 1106, an object 1108, a file 1110, an object 1112, and an object 1114.

The de-serialized data store transaction system 1100 utilizes a homoiconic (self-describing) n-tuple-based deserialized format; presenting the data the same way in code as it does when stored in memory. This format enables storage of multiple data types in a single multimodal database without the need for large-scale data duplication or serialization to link the data in different ways. Instead, the data may be stored as a single tuple database, and relations may be added on the fly. Further, these tuples may be encoded in any convenient format, for example, as (1 'foo') or (00000001 00100111 01100110 01101111 01101111 00100111). The tuples are lexicographically self-sorting and stored in a content addressable memory so the content of any query acts as an address for the location of the tuple containing the relevant information which may be retrieved quickly. Searching becomes trivial and almost implicit. The system utilizes a Lisp-derived syntax and semantics, utilizing prefix notation and representing both source code and data as symbolic expressions (s-expressions). Standard s-expressions ("symbolic expression") are a notation for nested list (tree-structured) data, here the s-expressions have been modified to be nested tuples, where tuples and other data types may be nested within an initial tuple.

To select the columns within a table to make a query, using, for example SQL, a user must use the commands which trigger the data tables and columns to be individual searched, then deserialized and returned.

SQL Example:
Table named EMPLOYEE_TBL
LAST_NAME FIRST_NAME EMP_ID
SELECT EMP_ID, LAST_NAME
FROM EMPLOYEE_TBL
WHERE EMP_ID='123456'

Here, a user could design a function called "get" to return the same information:
(get (EMPLOYEE_TBL (get LAST_NAME FIRST_NAME (get EMP_ID '123456'))))

Figure 12:
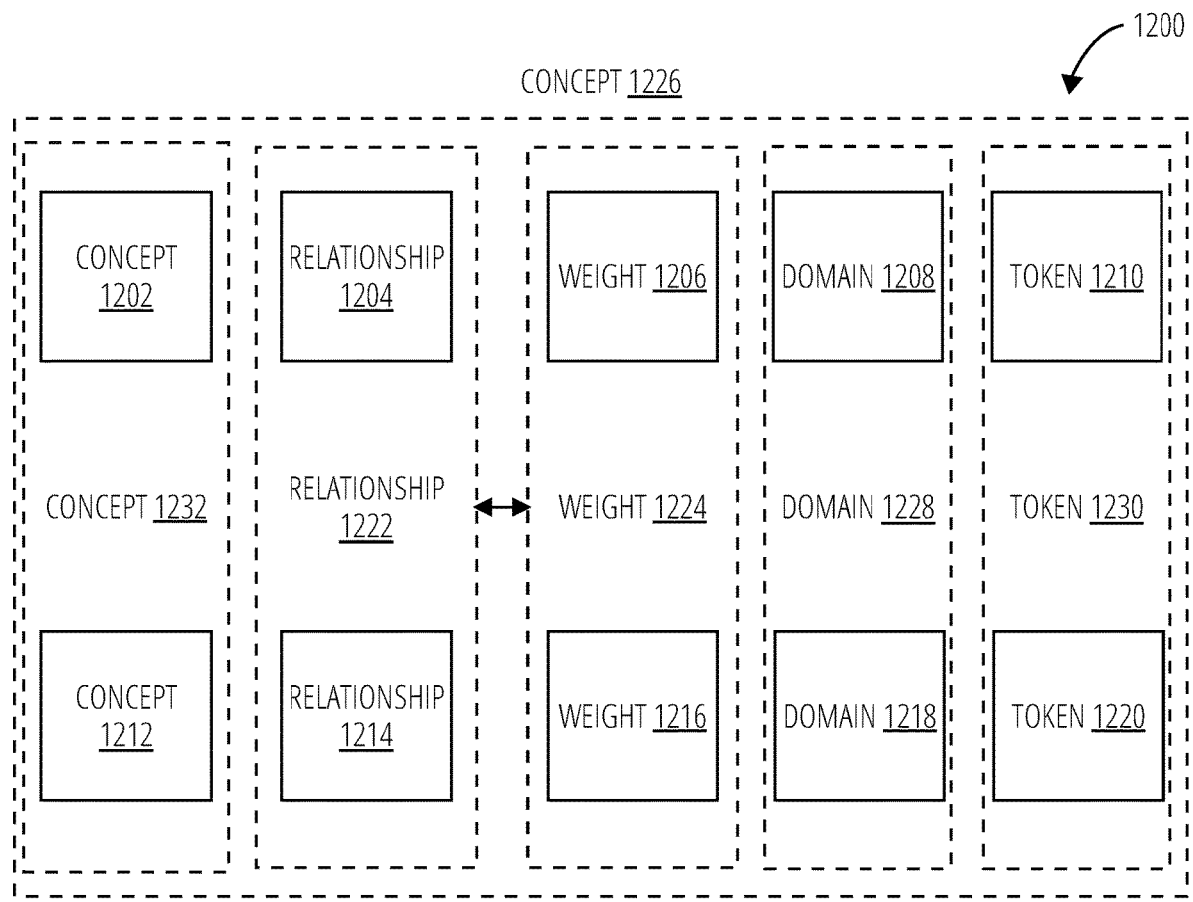
FIG. 12 illustrates a digital apparatus 1200 in accordance with one embodiment.
Figure 13:
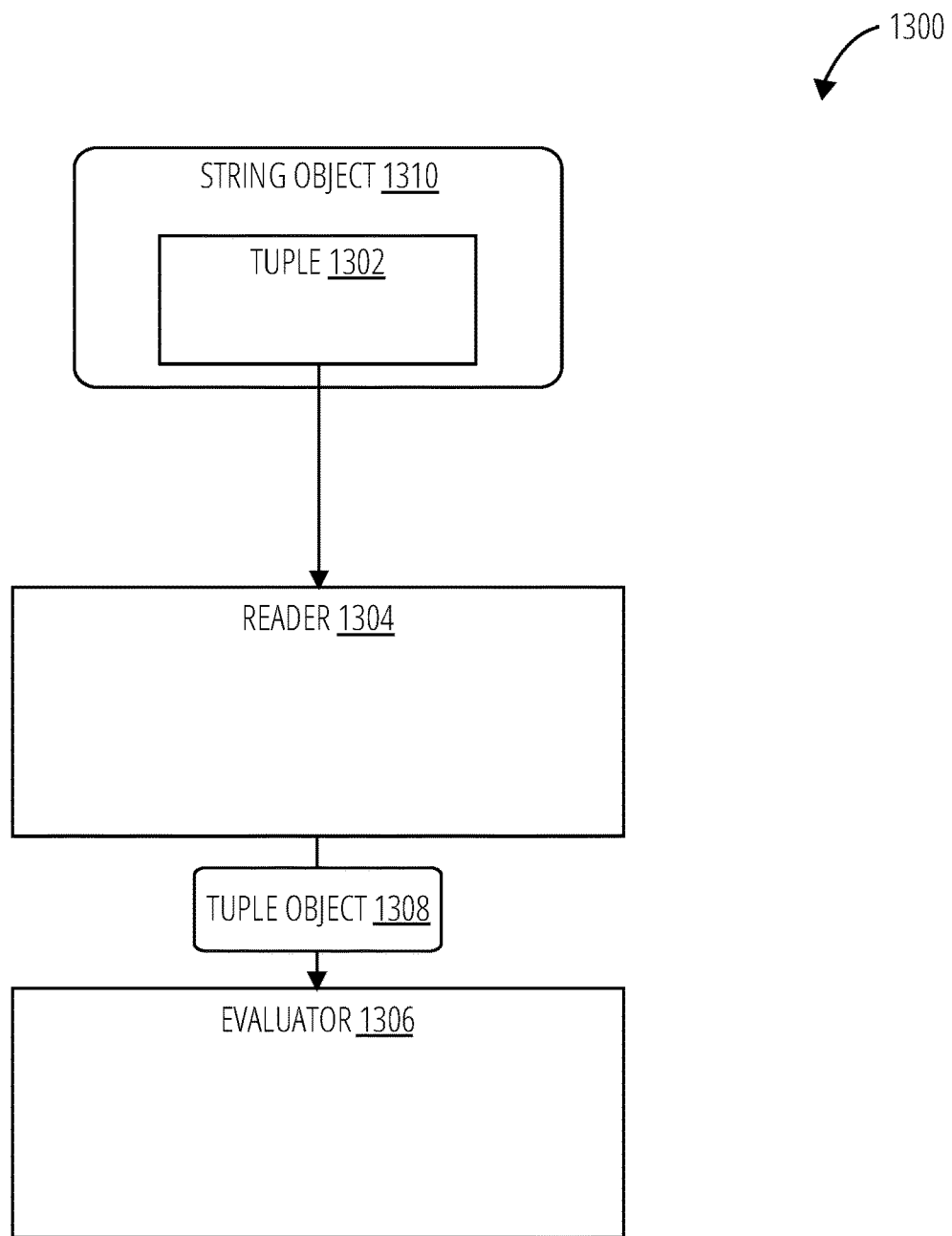
FIG. 13 illustrates a flow chart of a process employed by a unified data store and transaction system 1300 in accordance with an embodiment.

Referring now to FIG. 12, the unified data store taxonomy model 1200 comprises a concept 1202, a relationship 1204, a weight 1206, a domain 1208, a token 1210, a concept 1212, a relationship 1214, a weight 1216, a domain 1218, a token 1220, a relationship 1222, a weight 1224, a concept 1226, a domain 1228, a token 1230, and a concept 1232.

The concept 1226 may be a data type, similar to a namespace or class. The unified data store taxonomy model 1200 may require five concepts: the self-describing data object 1032 (self-defining), the relationship 1222, the weight 1224, the domain 1228 and the token 1230. A domain 1208 may be conceptualized as a knowledge domain which may be defined by the user. For given data, the user may define multiple domains. Relationship 1222 may be a connection between two different pieces of data (concepts, domains, tokens). The weight 1224 provides the strength for the relationship 1222. For example, a user may define the following concepts: (createConcept 0), (createConcept 1), (createConcept 2), (createConcept 3), domain(createConcept 4).

This may allow for the creation of a tuple with the format: (concept,relationship,weight,domain,token). A relationship may be established between different concepts, tokens or domains, for example the unique identifier 1002 and the unique identifier 1012 may be connected to one another by the relationship 1204 and the relationship 1214. This relationship may have a weight which denotes the strength of one datum/type to another. Weights may have values per relationship type, indicating the strength of the given relationship. A relationship may be defined as unidirectional or bi-directional. For example, a relationship may only be denoted in relationship 1204 referring to a relationship 1214, or it may be defined in both tuples. Similarly, weights may differ directionally as well. For example, a first tuple may have a weight 1206 of 0.7 to a second tuple but the second tuple may have a weight 1216 of 0.9 to the first tuple. The weights may also be the same between both tuples.

This taxonomy implicitly reflects the underlying organization and architecture of a unified data store and content addressable memory when used in conjunction therewith allows for a substantial increase in a computer's operational efficiency pertaining to data querying and management.

The taxonomy model is a conceptual graph built from atomic (meta-circular) data objects ("concepts") Everything in the model is represented uniformly, by concepts themselves. Each "concept" may receive a numeric 'concept ID', which may be, for example increasing numbers starting at 0. Concepts are used to define other concepts, and anything stored will relate back to the initial model. The first concept will be the idea of a concept itself which is given an ID 0. All other concepts may then be namespaced under this ID in the key-tuple store, so the first tuple will be [0 0], to be interpreted as 'the concept "concept"'. Utilizing s-expressions a function may be created to define the first concept, allowing the first concept to be generated in the following manner: (createConcept 0).

```
;|defines anew key in the 'concept' namespace|;
    (defn createConcept
    (
    id
    )
    (db.createKey [
    0 ;| namespace: concepts|;
    id
    ])
    )
```

Concepts may be further expanded to show relationships between concepts, with a "relationship" concept.

This may be established, for example, by: (createConcept 1)

These concepts allow new tuples to be created which describe the relationships between concepts. These may be namespaced by the concept ID for relationship, "1" in the current example model. This model may then be extended to incorporate weighted relationships. Without weights, our createRelationship operator will look as follows:

(defn createRelationship (conceptId relationshipTypeConceptId relatedConceptId) (db.createKey [1 conceptId relationshipTypeConceptId relatedConceptId]))

For example, the concept 'animal' is a hypernym of the concept 'tiger', so given three concepts, "animal" as 100, "tiger" as 101, and "hypernym of" as 102, the relationship could be defined as:

(createRelationship 100 102 103)

The model also supports weighted relationships by first defining the concept 'weight', and then adding a fourth parameter to the createRelationship operator:

```
(createConcept 2) ; weight
(defh createRelationship
(
conceptId
relationshipTypeConceptId
relatedConceptId
weight
)
 (db.createKey [
1 ; namespace: relationships
conceptId
relationshipTypeConceptId
relatedConceptId
2 ; weight
weight
])
)
```

In order to map from external data sources to the concept model. To do this, we will create the concepts 'domain' and 'token'. 'Domain' refers to the way in which the data is represented, and token refers to associated data. For example, when talking about human languages, this could be 'English', 'Spanish' or any other languages that were defined. In the context of political parties for example, these tokens could be Zip codes or GPS coordinates. In addition, it is also possible to create combinations of tokens across domains.

(createConcept 3); domain (createConcept 4); token

A token may refer to many concepts, and one concept can be captured by many tokens, and weights may be assigned in one or both directions. Weights may be used by the application to define how tightly tokens are bound to concepts and vice-versa. For example, one weight may link concepts to tokens in a domain, and another may link tokens in a domain to concepts.

The first weight (the 'token weight') represents how tightly the token is bound to the concept, as opposed to other tokens. For example, the tokens from the domain 'English', "cat", and "tiger", may both describe the abstract 'tiger', but the actual word "tiger" is more likely to be used to describe the concept of a 'tiger' than the word "cat". The second weight (the 'concept weight') represents how tightly the token is bound to this concept, as opposed to other concepts. For example, the token "cat" may refer to 'tiger' only 10% of the time, and to other things 90% of the time.

To do all of this, we will define a single operator:

```
(defn createToken
(
conceptId
domainConceptId
value
tokenWeight
conceptweight
)
```

```
(begin
; create link from concept to token
(db.createKey [
3 ; namespace: domain
0 ; concept
conceptId ; concept ID: concept
domainConceptId ; English, GPS, etc.
4 ; token
value ; domain representation (word, coordinates, etc.)
2 ; weight
tokenWeight
])
; create link from token to concept
(db.createKey [
3 ; namespace: domain
domainConceptId ; English, GPS, etc.
4 ; token
value ; domain representation (word, coordinates, etc.)
0 ; concept
conceptId ; concept ID: concept 15
2 ; weight
conceptWeight
])
)
)
```

The unified data store and transaction system 1300 comprises a tuple 1302, a reader 1304, an evaluator 1306, a tuple object 1308, and a string object 1310.

The unified data store and transaction system 1300 may be a tuple processor. A tuple 1302 may be input as a typed string, the string object 1310, the parts of which may represent any data type. The tuple 1302 may apply standard string operations (may be concatenated, trimmed, split etc.) as well as apply operations unique to the data types within it. The code for the unified data store and transaction system 1300 may be run on an interpreter or as compiled code. The unified data store and transaction system 1300 may utilize prefix notation, e.g. (OPERATOR, OPERAND, OPERAND . . . ). By way of example (a*(b+c)/d) may be written as (/(*a(+b c))d).

Evaluation of a tuple 1302 by the unified data store and transaction system 1300 may comprise reading the tuple 1302 with a reader 1304 wherein the reader 1304 translates the tuple 1302 which may be in string format into a tuple object 1308. The semantics of the commands and tuple objects may then be evaluated by the evaluator 1306.

The evaluator 1306 may evaluate the syntax which has been defined by the user. The evaluator 1306 may be a function which may take the tuple as an argument. The system stores data, regardless of type, in a tuple format. This provides the data structure with uniformity and allows for a multimodal data store, requiring little-to-no duplication of the data to relate different categories and types of data. Further, this architecture allows for multimodal databases to easily be stored within the same process space, leading to further increases in efficiency. For example, a user may have a set of tuples which represents time stamps, and another set of tuples which represents geolocations. The user may wish to associate the two of these, and so may combine them into a new tuple for storage within the database. The same operators may be used on the new tuple, and each subpart of the tuple as each element is a tuple. This allows different types to be stored in the same database. For example, a database of tweets may include the content of the tweet, string objects; as well as the times of the tweets, time-series; connections between the users, connected-graph; and location the tweet was sent from, geospatial. These may all be encapsulated in a single database. For example, the tuples may be arranged such that tweets are embedded within geospatial data which is embedded within time.

The system stores data, regardless of type, in a tuple format. This provides the data structure with uniformity and allows for a multimodal data store, requiring little-to-no duplication of the data to relate different categories and types of data. Further, this architecture allows for multimodal databases to easily be stored within the same process space, leading to further increases in efficiency. For example, a user may have a set of tuples which represents time stamps, and another set of tuples which represents geolocations. The user may wish to associate the two of these, and so may combine them into a new tuple for storage within the database. The same operators may be used on the new tuple, and each subpart of the tuple as each element is a tuple. This allows different types to be stored in the same database. For example, a database of tweets may include the content of the tweet, string objects; as well as the times of the tweets, time-series; connections between the users, connected-graph; and location the tweet was sent from, geospatial. These may all be encapsulated in a single database. For example, the tuples may be arranged such that tweets are embedded within geospatial data which is embedded within time.

The tuple may be instantiated (time minute hour day weekday week month year (geolocation latitude longitude locationString) (tweet tweetString)). Queries made to find a specific day of the week may query using the "weekday" position and all tuples which had matching content would be retrieved using that implicit "address". This also allows for the returned information may be pruned in real time by altering individual parts of the tuples, to constrain them, for example, by specifying only tweets from Amsterdam on Jul. 1, 2017. Further, because the tuples are ordered, the user may also query by specifying a range of indices. For example, to get the day and time of all the tweets, the indices 1-4 could be retrieved. When querying with a range, the order of complexity of the query is proportional to the length of the tuple, (order x, where x is the number of bytes in the tuple). The system also allows for reduced overhead when constraining existing queries; since the content of the tuples acts as an implicit address, if the user wished to constrain the data returned, a constraint could be specified to narrow the query. The system would not need to find and remove all the non-matching entries but would simply no longer return the non-matching entries.

Figure 14:
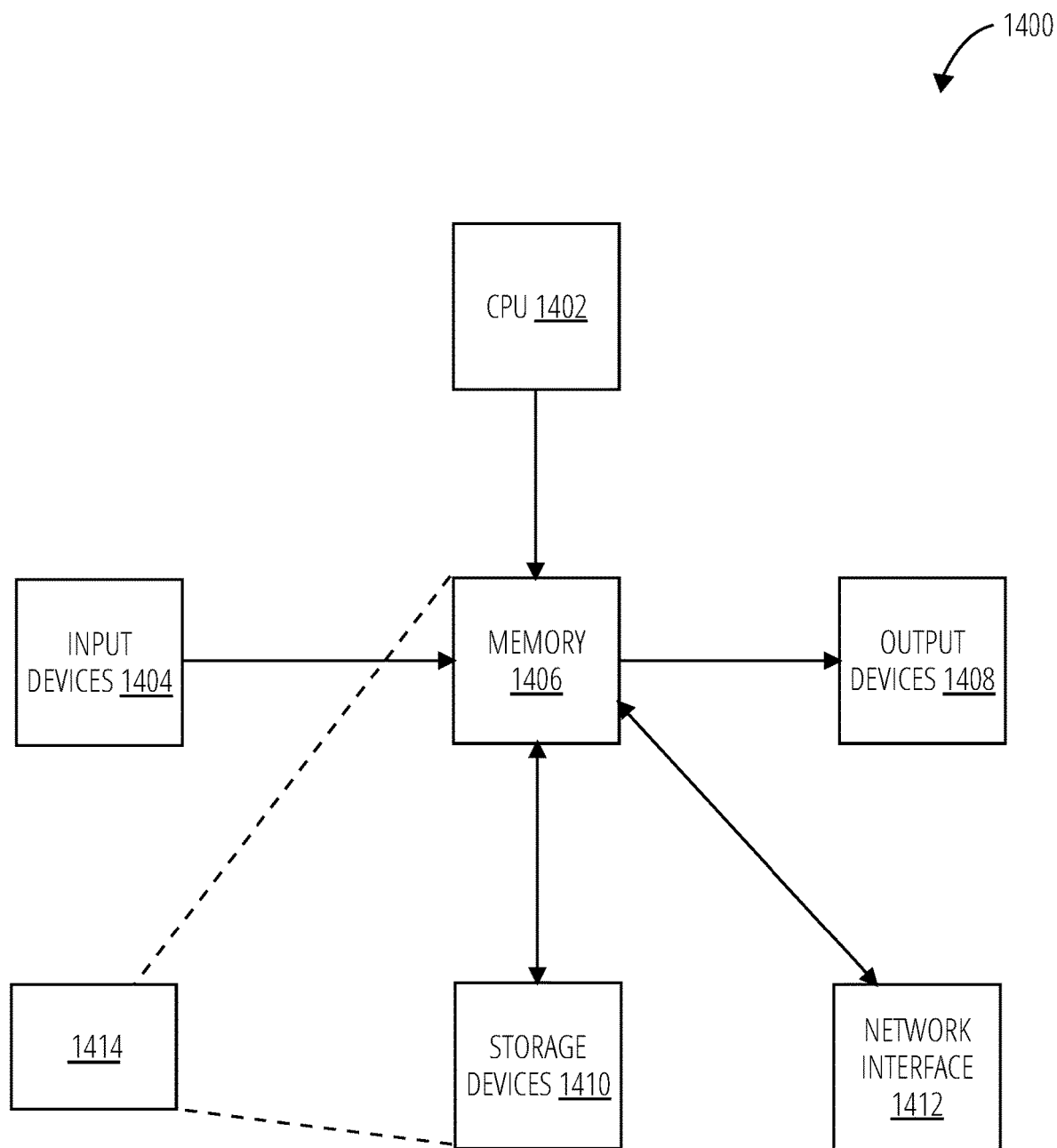
FIG. 14 illustrates an embodiment of a digital apparatus 1400 to implement components and process steps in accordance with an embodiment.

FIG. 14 illustrates an embodiment of a digital apparatus 1400 to implement components and process steps of the system described herein.

Input devices 1404 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1404 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1404 are provided via various machine signal conductors (e.g., busses or network interfaces) and circuits to memory 1406.

The memory 1406 is typically what is known as a first or second level memory device, providing for storage (via configuration of matter or states of matter) of signals received from the input devices 1404, instructions and information for controlling operation of the cpu 1402, and signals from storage devices 1410.

The memory 1406 and/or the storage devices 1410 may store computer-executable instructions and thus forming logic 1414 that when applied to and executed by the cpu 1402 implement embodiments of the processes disclosed herein.

Information stored in the memory 1406 is typically directly accessible to the cpu 1402 of the device. Signals input to the device cause the reconfiguration of the internal material/energy state of the memory 1406, creating in essence a new machine configuration, influencing the behavior of the digital apparatus 1400 by affecting the behavior of the cpu 1402 with control signals (instructions) and data provided in conjunction with the control signals.

Second or third level storage devices 1410 may provide a slower but higher capacity machine memory capability. Examples of storage devices 1410 are hard disks, optical disks, large capacity flash memories or other non-volatile memory technologies, and magnetic memories.

The cpu 1402 may cause the configuration of the memory 1406 to be altered by signals in storage devices 1410. In other words, the cpu 1402 may cause data and instructions to be read from storage devices 1410 in the memory 1406 from which may then influence the operations of cpu 1402 as instructions and data signals, and from which it may also be provided to the output devices 1408. The cpu 1402 may alter the content of the memory 1406 by signaling to a machine interface of memory 1406 to alter the internal configuration, and then converted signals to the storage devices 1410 to alter its material internal configuration. In other words, data and instructions may be backed up from memory 1406, which is often volatile, to storage devices 1410, which are often non-volatile.

Output devices 1408 are transducers which convert signals received from the memory 1406 into physical phenomenon such as vibrations in the air, or patterns of light on a machine display, or vibrations (i.e., haptic devices) or patterns of ink or other materials (i.e., printers and 3-D printers).

The network interface 1412 receives signals from the memory 1406 and converts them into electrical, optical, or wireless signals to other machines, typically via a machine network. The network interface 1412 also receives signals from the machine network and converts them into electrical, optical, or wireless signals to the memory 1406.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be affected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. A de-serialized data store and transaction system comprising:
    a multimodal database configured to store multiple data types, including nested data types and n-tuple-based multimodal data structures;
    a content addressable memory storing self-describing n-tuples mapped to entries in the multimodal database, wherein at least one tuple is a nested tuple comprising two or more data types;
    a search line driver in communication with the content addressable memory; and
    a processor in communication with a second memory storing instructions that, when executed by the processor, causes the system to:
        receive information comprising at least two data types;
        generate an n-tuple-based multimodal data structure based on the information, wherein the n-tuple-based multimodal data structure is a nested data type comprising at least one of a streamable syntax tree and a plurality of s-expressions;
        store the n-tuple-based multimodal data structure in the multimodal database;
        map n-tuples in the content addressable memory to the n-tuple-based multimodal data structure;
        in response a query at the search line driver, the query being indicative of an n-tuple, identify and output the corresponding n-tuple-based multimodal data structure.

2. The de-serialized data store and transaction system of claim 1 wherein the n-tuple-based multimodal data structure supports string-like properties.

3. The de-serialized data store and transaction system of claim 1 wherein the n-tuple-based multimodal data structure is homoiconic.

4. The de-serialized data store and transaction system of claim 1 wherein tuples are received as a string of typed data.

* * * * *